Dec. 22, 1970  K. WILFERT  3,549,469
INTERIOR PADDING FOR VEHICLES
Filed Sept. 7, 1966
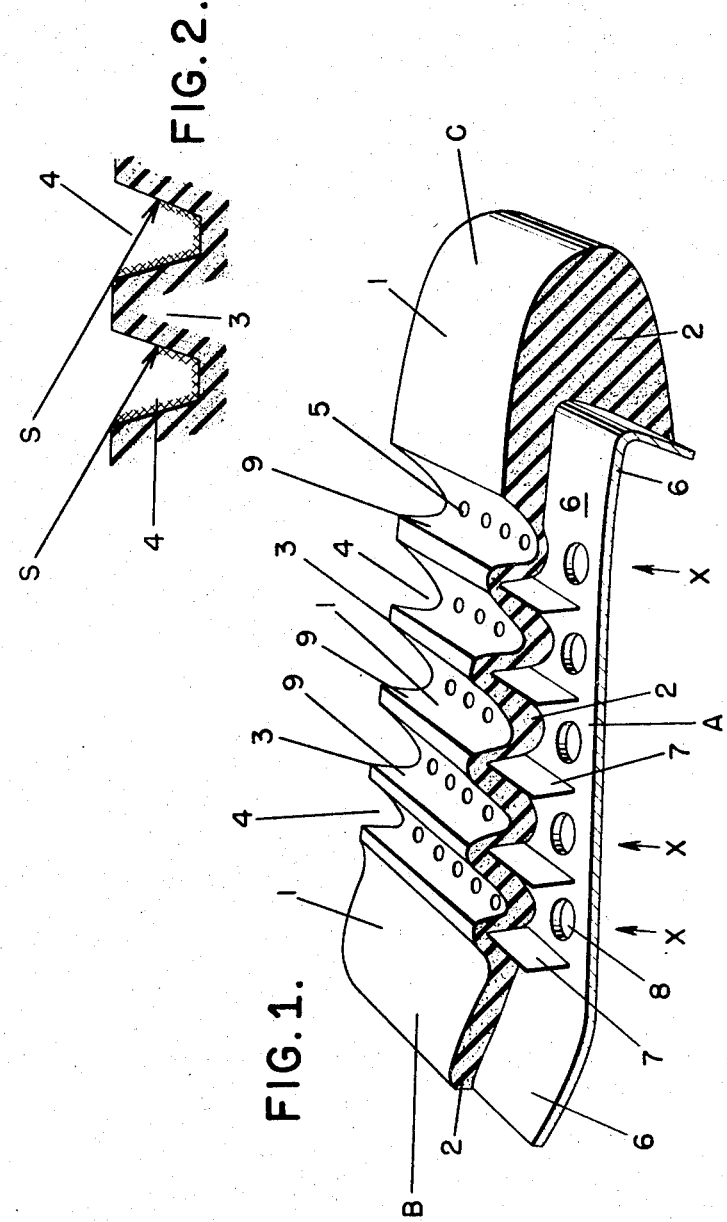
KARL WILFERT
INVENTOR
BY
ATTORNEYS United States Patent Office 3,549,469
Patented Dec. 22, 1970

3,549,469
INTERIOR PADDING FOR VEHICLES
Karl Wilfert, Gerlingen-Waldstadt, Germany, assignor to Daimler-Benz Aktiengesellschaft, Stuttgart-Unterturkheim, Germany
Filed Sept. 7, 1966, Ser. No. 577,676
Claims priority, application Germany, Sept. 15, 1965, D 48,209
Int. Cl. B32b 3/12; B62d 25/14
U.S. Cl. 161—69                                                4 Claims

ABSTRACT OF THE DISCLOSURE

A resilient protective padding for the passenger compartment or the like of motor vehicles, wherein the protective padding consists of a thin sheet-like cover layer having an elastically resilient upholstery layer underneath. The padding is also provided with elevations and depressions alternately arranged and extending transverse to incident illumination so as to reduce the glare from light entering the vehicle passenger compartment. Air passage holes are provided in the bottom of the depressions which, together with the increased surface area of the padding, increase the heat dissipation.

BACKGROUND OF THE INVENTION

The present invention relates in general to motor vehicles and more particularly to a resilient protective padding for the passenger compartment and other areas of the vehicle susceptible to causing injuries in case of accident.

The invention relates to a covering consisting of a cover layer having an elastically resilient upholstery layer underneath, for the interior lining of vehicles, the cover layer being likewise elastically resilient. Such coverings are preferably provided in a horizontal position over the instrument panel of an automobile, or in some cases are provided above a vehicle compartment, for example, the baggage compartment or engine space.

When arranging the padding over the vehicle instrument panel, the covering must be fashioned in a sufficiently resilient manner to serve effectively as a protective padding in order to prevent serious injuries to the passengers in case of accidents, especially where the persons occupying the car are flung forward, into the instrument panel, for example. However, in addition to the cushioning effect produced by this covering, the visible surface of such a covering must furthermore be such that light reflections in the windshield of the vehicle are avoided, which light reflections have a tendency to impair the driver's vision through the windshield and the clear observation of the traffic ahead. Unfortunately, the materials commonly used which provide the most durability and the most advantageous cushioning effects have a tendency to produce much glare and absorb much heat from the direct sun. This is especially true of the cover layer for the padding which is generally a shiny plastic capable of reflecting light efficiently and absorbing heat in spite of the various colors in which it is provided.

The requirements therefore make it mandatory to provide a padding having both a dull non-glossy and dark-colored finish for the upper cover layer and an inner lining of resilient padding material, for example, foam material. However, this requirement for the cover layer also has the disadvantage that it results in a strong absorption of light and heat rays. Since the upholstered lining serves as a heat insulator, it therefore substantially prevents the removal of this heat, with the result that the covering is overheated by light and heat radiation, as experience has shown, particularly in tropical areas, and this leads to many disadvantages.

SUMMARY OF THE INVENTION

In order to eliminate the above-mentioned eficiencies, the invention proposes to provide a vehicle padding wherein the covering is provided with elevations and with depressions alternately arranged and extending transverse to the incident illumination. A particularly advantageous embodiment of the invention is the construction of these elevations in the shape of ribs and the provision of the depressions as grooves located between the ribs. By this configuration, the advantage is obtained that, by increasing the total area of the covering, the reflection of excess heat is enhanced and heat dissipation is increased on account of convection; at the same time, shade spots are formed in the depressions between the elevations, protecting the shaded area sections from the incident heat radiation. The percentage proportion of the shaded areas with respect to the total area of the covering varies, depends upon the direction of incidence of the rays, but the average shaded proportion of the area is sufficient for favorably influencing the ratio of heat dissipation and heat impingement toward a cooling of the covering.

Furthermore, the division of the surface of the covering into elevations and depressions, ribs and grooves, results in an interruption of the planar configuration of the surface. Therefore, in case of unavoidable light reflections, the reflected images in the windshield are less troublesome, since vision-impairing large-area reflections are avoided.

It has also proved to be particularly advantageous in accordance with the invention to produce the padding layer of resilient foam rubber or plastic, and the cover layer of a likewise resilient plastic foil. These materials can be worked easily by means of time-saving manufacturing processes, and they result in a light-weight, dust-free, and hygienic product having a cover layer which can be cleaned without difficulty.

In order to enhance the inherent heat dissipation from the covering by natural convection, it is additionally advantageous according to the invention to increase the movement of the air in the vicinity of the covering by producing an artificial air current and to blow, for this purpose, a stream of cool air through air passage holes in the covering. In this connection, the arrangement of air passage holes on the bottom of the grooves located between the ribs is particularly advantageous, because in such a case, the air stream additionally flows or is guided along the flank areas of the grooves producing an overall increased cooling effect.

The padding of the invention, consisting of a cover layer padded with an upholstery layer therebelow, can be constructed in a particularly simple and advantageous manner by providing in the resilient material a succession of waves formed by neighboring ribs and grooves; this covering can then be fixedly mounted by supporting the resilient ribs by means of sheet metal strips forming part of a base or frame having high webs and the upper edges of these webs extending along the ridged lines of the roof-shaped ribs. In this connection, the base is provided with air passage holes of a sufficient size to provide air to all of the air holes in the padding.

It is a principal object of the present invention to provide a resilient padding for select areas of motor vehicles, and particularly the instrument panel, which avoids or otherwise completely eliminates the problems inherent in known constructions of a similar nature.

It is another object of the present invention to provide a padding of the type described which materially reduces the glare from light entering the vehicle passenger compartment.

It is a further object of the present invention to provide a padding of the type described which has increased heat dissipating qualities.

It is still another object of the present invention to provide a padding of the type described which is economical of manufacture, durable and attractive and still avoids the difficulties inherent in known arrangements.

It is still a further object of the present invention to provide a padding of the type described which is constructed to facilitate convection of cooling air through and along the surface thereof.

BRIEF DESCRIPTION OF THE DRAWINGS

These and other objects, features and advantages will be made clearer from the following detailed description of the invention, when taken in conjunction with the accompanying drawings which illustrate one exemplary embodiment of the invention and wherein:

FIG. 1 shows a section of the inventive covering, partially broken away, only a portion of this covering being illustrated; and FIG. 2 shows schematically the formation of shaded spaces within the grooves of the covering provided between the ribs.

DETAILED DESCRIPTION OF THE DRAWINGS

Referring now more specifically to the drawings, the padding of the invention consists of a cover layer 1 and an upholstered layer 2. Both layers are firmly secured or bonded to each other by any conventional means and are provided of a form including alternately arranged ribs 3 and intermediate grooves 4. At the bottom or root of the grooves 4, the covering is provided with perforations 5 preferably in the form of holes extending through the cover layer 1 and the upholstered layer 2, although the perforations may take the form of slits or apertures of any shape within the teachings of the invention. The covering is supported by a sheet metal base or frame 6 carrying upright webs 7; the covering rests on the upper edges of the webs 7, which extend into suitable recesses formed beneath the ribs 3 on the opposite side of the covering. The base or frame 6 may be made of any rigid material, such as metal or plastic, with the webs 7 being secured to or integrally formed therewith in any known manner.

Above-atmospheric pressure cooling air, which may be derived from the vehicle ventilation system or the like and supplied in chamber A flows, in the direction of arrows X, through holes 8 in the base 6 underneath the covering 1, 2, then through the covering through perforations 5 and thereafter flows along and around the flanks 9 of ribs 3, which serve as guides or ducts for the air. At the terminal edges of the covering, extensions B and C are fashioned as a planar surface (B) and an upholstered bulge (C). The bulge (C) is preferably directed toward the passengers to cushion impacts and the surface (B) extends toward and terminates at or near the windshield for coverings over the instrument panel.

In FIG. 2, the manner in which the shaded spaces and shaded area portions of the covering layer 1 are produced at an angle of incidence to the rays S derived from the sun or bright headlights or street lights in the grooves 4 illustrated schematically; this angle of incidence is chosen as an example only to show how shaded areas are created which prevent glare and increase the heat dissipating qualities of the surface. In the cross-sectional illustration, the shaded area portions are shown by hatched lines on the rear of the shaded areas.

It should be apparent from this description that the irregular surface provided in accordance with the invention facilitates the reflection of invisible heat, thereby cooling the surface, while providing such an angle incidence to visible radiation as to prevent its reflection into the vehicle passenger compartment or upward against the windshield at the level of the driver's vision. The advantages of such properties are readily apparent.

The above embodiments have been shown and descrbied only as examples of the present invention; it is understood that the same is not limited thereto but is susceptible of numerous changes, modifications as known to a person skilled in the art and we therefore do not wish to be limited to the details shown and described herein but intend to cover all such changes and modifications as encompassed by the scope of the appended claims.

I claim:

1. A padded covering for a dashboard or the area beneath a rear window within a vehicle comparement, comprising in combination a rigid base member, a resilient foam upholstered layer supported by said base member, and a non-glossy, sheet-like cover layer lined by said upholstered layer, characterized in that a plurality of alternately arranged elevations and depressions are provided in said padded covering and being arranged parallel with respect to a front or rear window of the vehicle, said depressions having an approximately trapezoidal cross-section which widens toward the upper surface of said padded covering, and a plurality of rib members located adjacent to and parallel with said depression and secured to said base member, wherein said rib members support said elevations.

2. The combination defined in claim 1 wherein said elevations are in the form of ribs and said depressions are in the form of grooves between said ribs.

3. The combination defined in claim 2, wherein said cover layer consists of a resilient sheet.

4. The combination defined in claim 1 further including a plurality of air passage holes through said cover layer and said upholstered layer at the bottom of said depressions.

References Cited

UNITED STATES PATENTS

| | | | |
|---|---|---|---|
| 2,628,928 | 2/1953 | Cadous | 161—77 |
| 2,687,446 | 8/1954 | Merrill | 156—210X |
| 2,763,586 | 9/1956 | Noyes | 161—115 |
| 3,088,539 | 5/1963 | Mathues et al. | 264—45X |
| 3,130,807 | 4/1964 | McHenry | 180—90 |
| 3,244,571 | 4/1966 | Weisman | 156—196 |
| 3,389,043 | 6/1968 | Clark | 161—43 |

JOHN T. GOOLKASIAN, Primary Examiner

H. F. EPSTEIN, Assistant Examiner

U.S. Cl. X.R.

161—99, 109, 121, 123; 180—90; 280—150; 296—70